United States Patent [19]

Urbaing

[11] Patent Number: 5,676,448
[45] Date of Patent: Oct. 14, 1997

[54] LIGHT FIXTURE FOR RUNWAYS OR TAXIWAYS

[75] Inventor: Bruno Urbaing, Marcinelle, Belgium

[73] Assignee: Thorn Europhane, Paris, France

[21] Appl. No.: 703,585

[22] Filed: Aug. 27, 1996

Related U.S. Application Data

[63] Continuation of Ser. No. 337,565, Nov. 10, 1994, abandoned.

[30] Foreign Application Priority Data

Nov. 17, 1993 [FR] France ................... 93 13716

[51] Int. Cl.⁶ ........................ F21V 31/02; F21V 5/04
[52] U.S. Cl. ................ 362/153.1; 362/267; 362/310; 362/328; 362/308
[58] Field of Search ................ 362/153, 153.1, 362/267, 268, 145, 308, 310, 327, 328, 331, 332, 330, 329, 339

[56] References Cited

U.S. PATENT DOCUMENTS

| | | | |
|---|---|---|---|
| Re. 34,709 | 8/1994 | Tyson | 362/153.1 X |
| 1,425,139 | 8/1922 | Rumsey | 362/153.1 |
| 1,572,214 | 2/1926 | McEwing | 362/153.1 |
| 1,853,321 | 4/1932 | Rogers | 362/153.1 X |
| 3,369,113 | 2/1968 | Loch. | |
| 4,924,364 | 5/1990 | Pannier | 362/153.1 |
| 4,931,914 | 6/1990 | Quioguc | 362/153.1 X |
| 5,335,151 | 8/1994 | Dahlberg | 362/153.1 |

FOREIGN PATENT DOCUMENTS 0285488  10/1988  France.

*Primary Examiner*—Thomas M. Sember
*Attorney, Agent, or Firm*—Frishauf, Holtz, Goodman, Langer & Chick, P.C.

[57] ABSTRACT

The light fixture comprises a pod suitable for being embedded in the ground, and housing a light source, and a cover provided with at least one opening containing an optical unit facing the light source. The optical unit is sealed relative to the cover by a gasket which fits snugly around the perimeter of a base portion of the optical unit and which is compressed by means of a presser member applied against a bottom surface of the optical unit. The cover provides a housing designed for the gasket and defined by contact surfaces comprising a wall facing the perimeter of the optical unit and a top abutment for the gasket parallel to the mean plane of the cover. The perimeter of the optical unit is shaped to act against the gasket in the manner of a wedge so that the gasket is compressed against the contact surfaces under drive from the presser member, the gasket being made of a material that is capable of creep under compression stress so as to fill the gap between the perimeter of the optical unit and the facing wall.

8 Claims, 4 Drawing Sheets

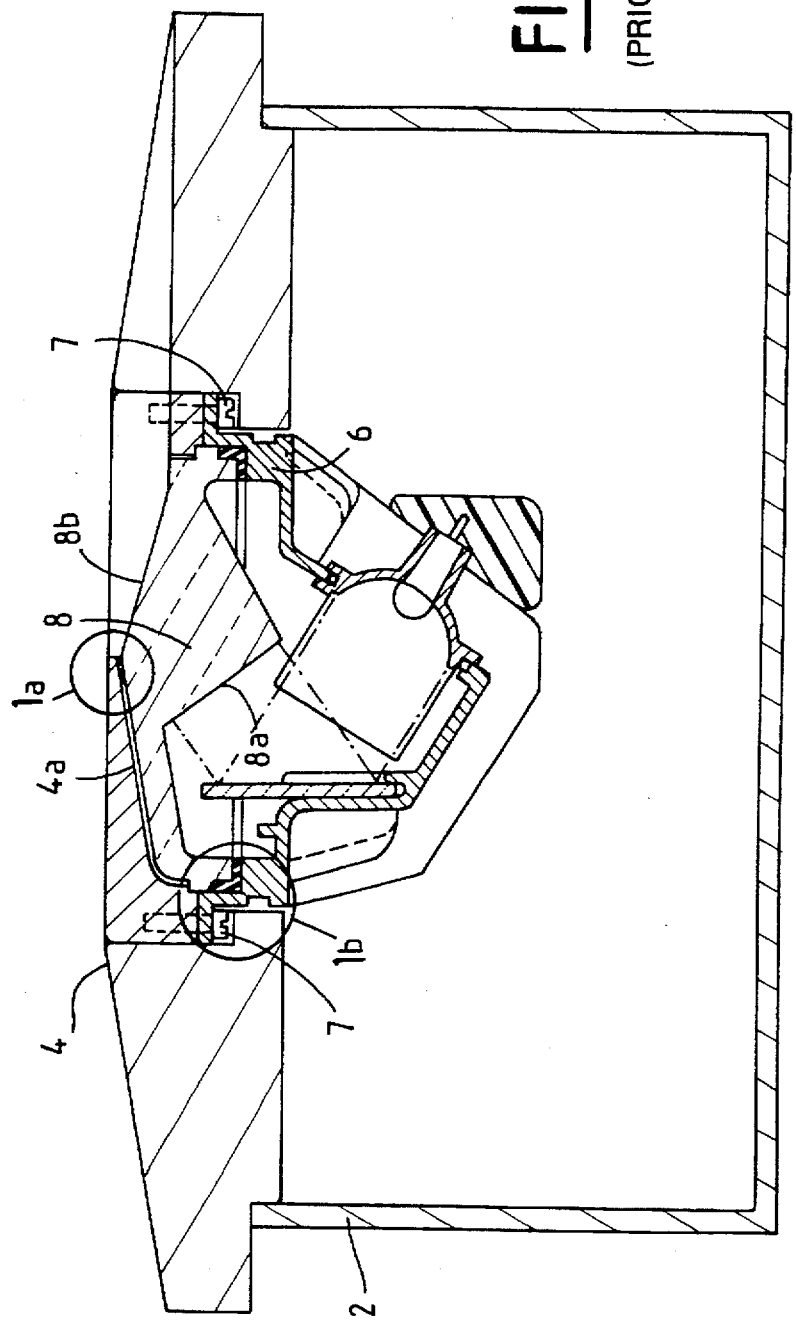
FIG. 1 (PRIOR ART)
FIG. 1a (PRIOR ART)
FIG. 1b (PRIOR ART)

LIGHT FIXTURE FOR RUNWAYS OR TAXIWAYS

This application is a Continuation of application Ser. No. 08/337,565, filed Nov. 10, 1994, now abandoned.

BACKGROUND OF THE INVENTION

1. Field of the Invention

The present invention relates to a light fixture for runways or taxiways, the light fixture being of the type comprising a pod that can be embedded in the ground, a light source situated inside the pod, and a cover closing the pod. The cover is provided with at least one opening in which an optical unit co-operating with the light source is sealingly mounted. The seal is provided by a sealing gasket which has a shape that substantially matches that of the perimeter of a base portion of the optical unit, and which is compressed by means of a presser member applied against a bottom surface of the optical unit.

2. Prior Art

A known light of that type is shown in FIGS. 1, 1a, and 1b. The optical unit 8 is in the form of a glass prism housed in an opening of the cover 4 that closes the embeddable pod 2. The prism 8 has a bottom face 8a forming an entrance window for light flux and an inclined top face 8b forming an exit window suitable for directing a light beam so that it can be seen from the cockpit of an airplane taxiing on a taxiway. The optical unit 8 is clamped in place by means of a bottom support piece 6 that is fixed to the cover by screws 7. The support piece 6 also serves to support a light source together with its reflector and a mirror for directing the light flux coming from the source to the entrance window 8a of the prism 8.

Sealing between the prism 8 and the cover 4 is provided by gaskets 10a and 10b respectively at the top of the prism 8 and around the bottom perimeter thereof.

The force exerted by the support piece 6 compresses the gasket 10a (FIG. 1a) between a top portion of the prism and a confronting face 4a of the cover. The essential functions of the gasket 10a are to protect the surfaces of the prism against the mechanical stresses due to its contact with the cover, and to avoid the seepage of water and the ingress of dust between the cover and the prism.

The gasket 10b (FIG. 1b) serves essentially to provide sealing between the prism 8 and the cover 4. It has an L-shaped cross-section within which the bottom edge of the prism 8 is received. The support piece 6 has a shoulder whose surfaces 6a and 6c fit around the outside faces of the gasket 10b in such a manner as to clamp the prism in the cover via the gasket 10b under the effect of tightening the screws 7. The vertical clamping force is opposed by the top portion of the prism bearing directly against the cover without any intermediate material, thereby running the risk of breakage.

In order to ensure that the gasket 10b is properly seated, it is necessary to machine the metal surfaces against which it bears, in this case the surfaces 6a and 6c of the bottom support piece 6.

Unfortunately, such machining operations are relatively lengthy and, in the present case, they give rise to significant extra handling costs since they require the support piece to be installed on a bed for machining solely for the purpose of preparing its surfaces that come into contact with the gasket.

In other examples of the prior art, the gasket is not received solely on the support piece, but lies between the support piece and the base of the cover around the optical unit. Nevertheless, there still remains the need to machine a bearing surface for the gasket on the support piece, and also a contact surface on the cover, which cover surface must often be inclined in a special plane in order to follow a corresponding inclined abutment surface of the optical unit.

SUMMARY OF THE INVENTION WITH OBJECTS

An object of the invention is to provide a runway or taxiway light fixture in which sealed mounting of the optical unit in the cover requires only a minimum of intervention for preparing the metal surfaces that come into contact with the sealing gasket.

Another object of the invention is to provide accurate and strong fixing for the optical unit with respect to the cover, while still enabling it to be dismounted for servicing.

According to the invention, these objects are achieved by a light of the type defined at the beginning of the description in which the cover provides a seat for the gasket, the seat being defined by contact surfaces comprising a wall facing the perimeter of the optical unit and a top abutment for the gasket parallel to the general plane of the cover; and the perimeter of the optical unit is shaped to act on the gasket in the manner of a wedge such that the gasket is compressed between the contact surfaces under the force from the presser member, the gasket being made of a material capable of exhibiting creep under compressive stress so as to fill the gap between the perimeter of the optical unit and the facing wall.

Advantageously, the sealing gasket has at least one portion of rectangular section, and the base portion of the optical unit has a shoulder which joins onto the wedge-shaped perimeter and which acts together therewith against an adjacent bottom-edge portion of the sealing gasket in order to urge the gasket against the contact surfaces of the cover.

Also advantageously, the top of the sealing gasket is extended by a peripheral sealing lip situated between the perimeter of the optical unit and a facing wall of the cover that surrounds the opening in the cover.

In a particular embodiment of the light fixture according to the invention, the optical unit comprises two prisms mounted side by side and the sealing gasket is configured like a figure "8" in a plan view, with the central branch of the "8" being inserted between the two prisms.

In this configuration, the top of the central branch of the gasket is extended by lips, each situated between an internal reflection face of a prism and a facing wall of the cover.

BRIEF DESCRIPTION OF THE DRAWINGS

The invention will be better understood and its advantages will appear more clearly on reading the following detailed description given in non-limiting manner and with reference to the accompanying drawings, in which:

FIG. 1 is a vertical section view through a prior an light fixture;

FIG. 1a is a detailed view on a larger scale showing a first sealing gasket of the FIG. 1 light fixture;

FIG. 1b is a detailed view on a larger scale showing a second sealing gasket of the FIG. 1 light fixture;

DETAILED DESCRIPTION OF THE PREFERRED EMBODIMENTS

Figure 2:
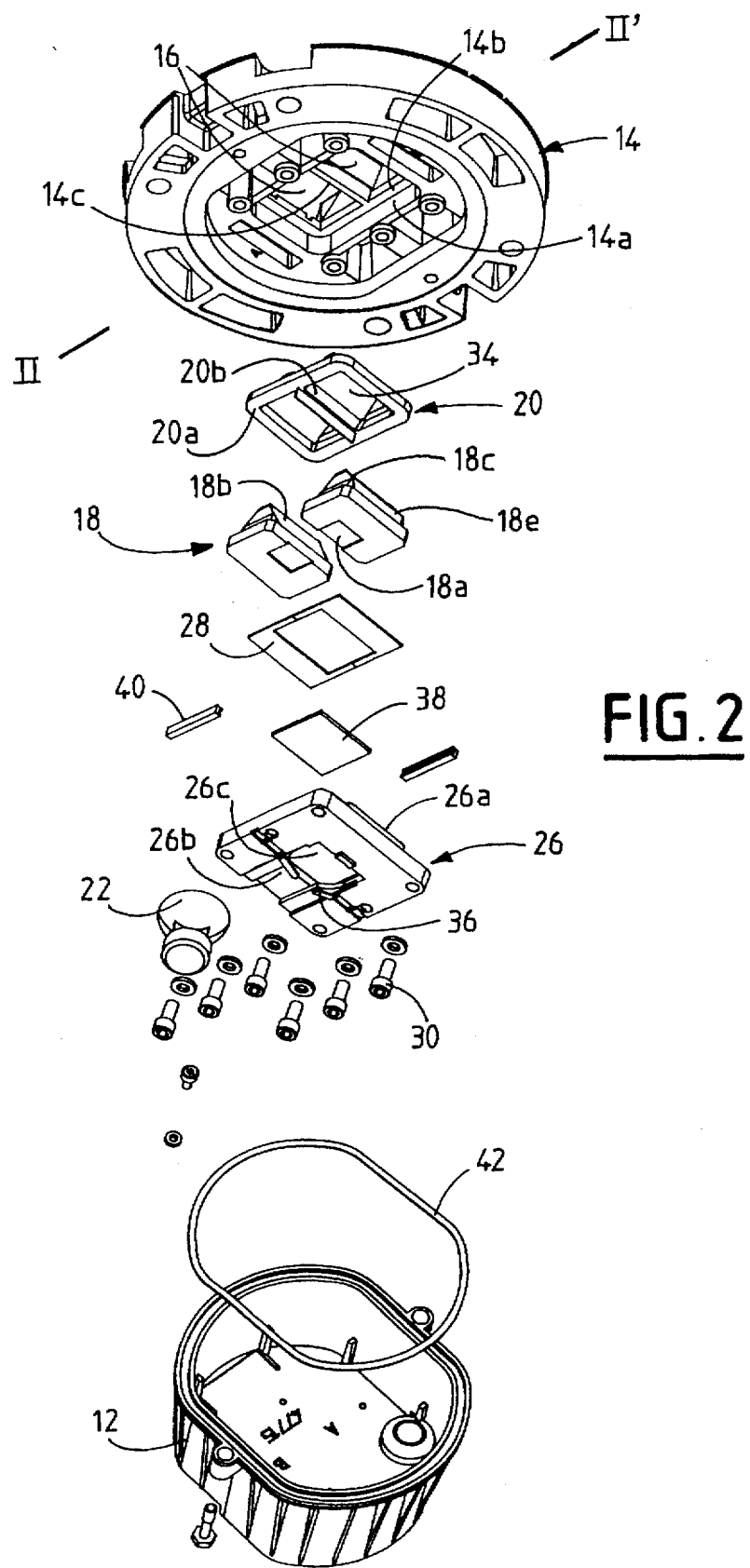
FIG. 2 is an exploded perspective view of the component pans of a light fixture constituting an embodiment of the present invention.
Figure 3:
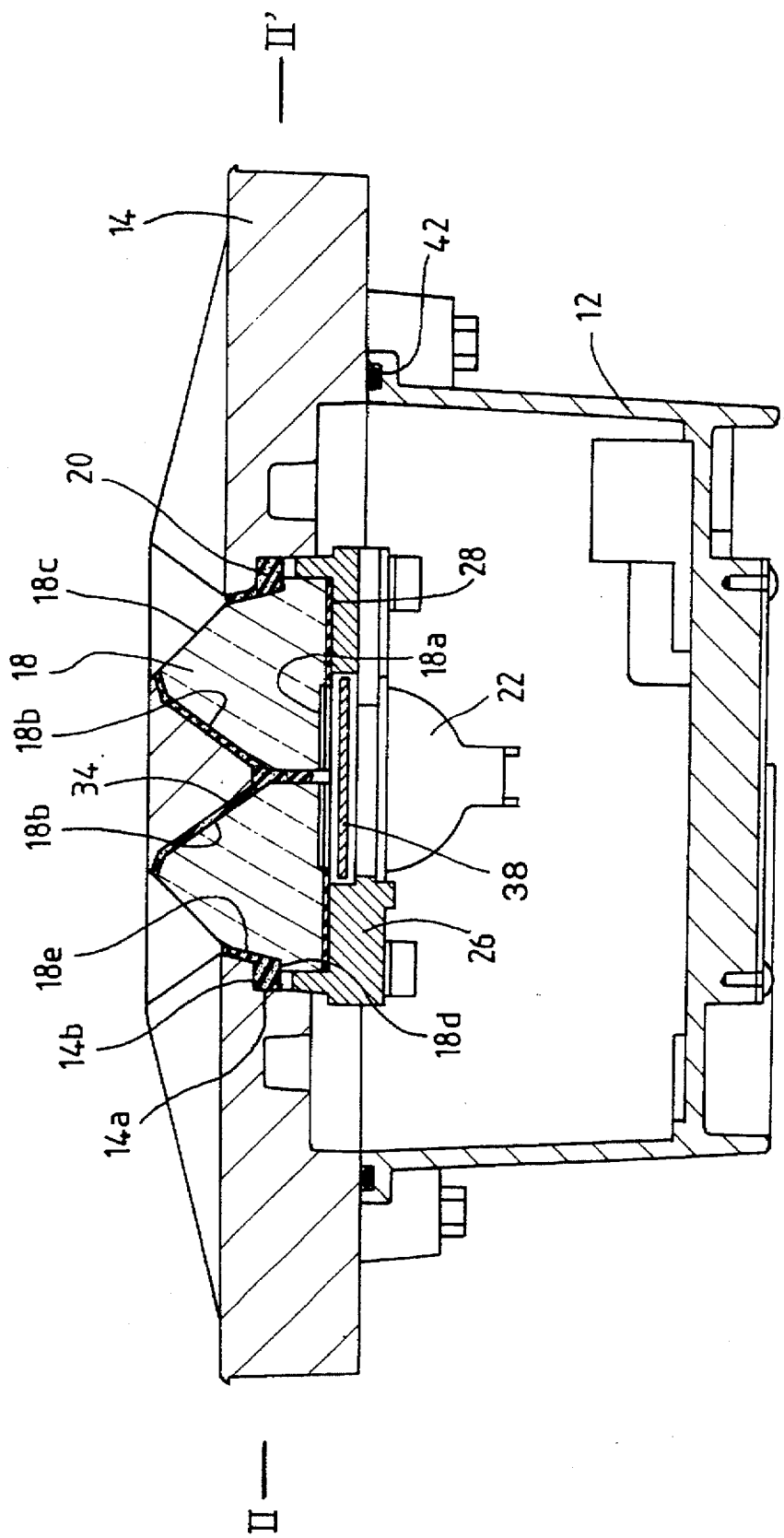
FIG. 3 is a vertical section view across the light fixture shown in FIG. 2.

As shown in FIGS. 2 and 3, the runway or taxiway light fixture comprises a pod 12 suitable for embedding in the ground and surmounted by a cover 14 which includes a central opening designed to receive an optical unit comprised of two identical prisms 18 disposed side by side.

Each prism 18 has an entrance window 18a at its bottom face for receiving light coming from a light source 22 housed in the pod 12. After reflection on an internal face 18b of the prism, the light is directed outwards through an exit face 18c of the prism. Each prism is designed so that the exiting beam is inclined at a predetermined angle with respect to the horizontal, whilst the respective beams coming from the two prisms are mutually directed in opposite directions in an azimuth at plane. The opening in the cover is constituted by two windows 16 separated by a cross-piece 14c of the cover (FIG. 2) with the exit faces 18c of the prisms appearing in the windows.

The prisms 18 are mounted in sealed manner in the cover 14 by means of a sealing gasket 20 which is compressed between the prisms 18 and the cover by means of a presser member 26 acting against the bottom faces of the prisms via a force-transmitting plate 28.

In plan view, the gasket 20 is configured like a figure "8", having a peripheral portion 20a and a central branch 20b. The central branch 20b co-operates with the peripheral portion to define two openings in which the bases of the prisms 18 are received. The central branch 20b extends between the two prisms 18 without clearance while nevertheless allowing them to be inserted freely.

The peripheral portion 20a of the sealing gasket is clamped between machined contact surfaces 14a and 14b forming portions of the cover, and between faces 18d and 18e forming portions of the perimeters of the prisms 18, at the bases thereof.

The contact surfaces 14a and 14b form an internal shoulder of the cover and are respectively perpendicular and parallel to the general plane thereof, the surface 14b facing towards the inside of the pod 12.

The faces 18d and 18e situated to face the surfaces 14b and 14a respectively define a shoulder at the bases of the prisms 18. The face 18d is parallel to the general plane of the cover and faces towards the outside of the pod. The face 18e forms a portion of the perimeter of the prisms and extends outwardly from the face 18d, at a small inclination towards the center of the optical unit, giving the base thereof a pyramidal shape.

Figure 4A:
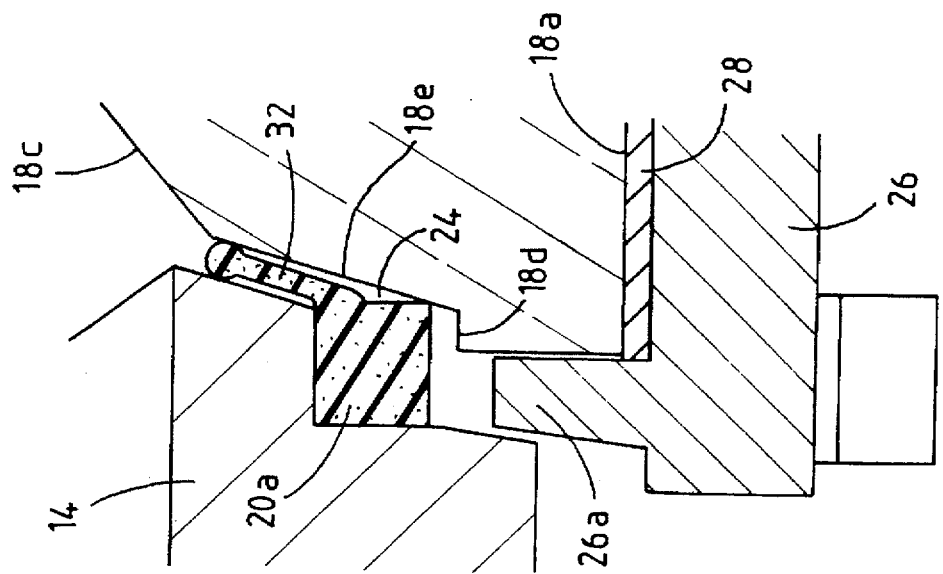
FIGS. 4a and 4b are detailed views on a larger scale showing how the gasket is mounted in the light fixture of FIG. 1, respectively before and after being clamped.

In the non-compressed state, the peripheral portion 20a of the gasket has a right-angular cross-section that is substantially perpendicular (FIG. 4a). It is inserted in the cover 14, with the shoulder defined by the surfaces 14a and 14b fitting closely to the outside shape of the periphery of the gasket.

When the prisms 18 are inserted in the openings in the gasket 20, their inclined perimeters 18e bear against the edge of the peripheral portion 20a opposite to its edge received in the shoulder of the cover 14, the face 18d being at a certain distance from the bottom surface of the gasket. Them is thus a gap 24 between the gasket and the perimeter 18e of each prism 18.

The gasket is clamped by applying pressure against the bottom faces of the prisms 18 by means of a presser member 26 which bears around the entrance windows 18a via an intermediate force-transmission plate 28. The intermediate plate 28 may be made of a transparent material, or as in the present example of an opaque material, e.g. polytetrafluoroethylene (FFFE), lead, or a lead alloy, in which case it includes a central cutout coinciding with the entrance windows of the prisms 18. The presser member 26 is fixed in removable manner against the bottom face of the cover by means of screws 30.

Figure 4B:
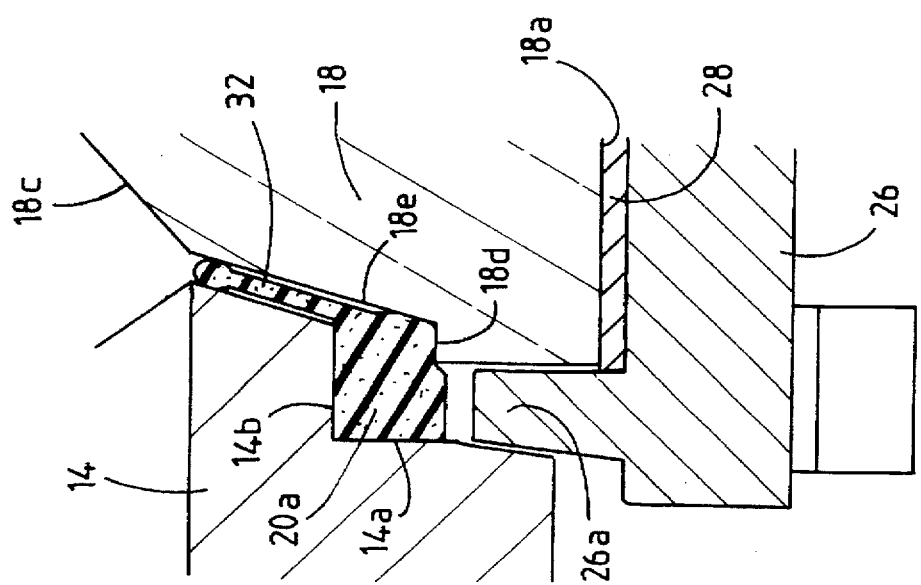

During clamping, the perimeter 1Be of each prism acts against the peripheral portion 20a of the gasket in the manner of a wedge. The gasket 20 is made of a material, such as an elastomer, that is liable to creep under compressive stress. The creep serves to fill the empty gap 24 during clamping, the clamping action being applied until and slightly beyond the position where the face 18d comes into abutment against the bottom surface of the gasket 20 (FIG. 4b).

The distance over which the clamping action is exerted and the dimensions of the gasket and of the various surfaces against which it comes into contact are determined so that the creep of the gasket material is sufficient to fill the empty gap 24 completely and to exert sufficient pressure against the inclined edge 18e of the perimeter of each prism and against the facing surface 14a of the cover. This pressure thus also contributes to urging the prisms 18 against the branch 20b of the gasket.

The peripheral portion 20a of the gasket is extended upwards by a sealing lip 32 which is integral with the gasket. The lip 32 is inserted between the inclined perimeter 18c of the base of the gasket and the edge of the opening 16 in the cover, above the shoulder formed by the surfaces 14a and 14b. In order to avoid hindering the clamping of the gasket 20, the sealing lip 32 provides only a small area of contact with the adjacent surfaces of the prisms and of the cover, in the form of a bead situated at its top end (FIGS. 4a and 4b).

In addition, the top of the central branch 20b of the gasket is extended upwards by two sealing lips 34 which are integral with the gasket and inserted between the reflecting faces 18b of the prisms 18 and the confronting surfaces of the cross-piece 14c of the cover 14.

In order to ensure that the prisms 18 are centered and held in place with the force-transmission plate 28, the presser member 26 is provided with a peripheral rib 26a which penetrates beneath the bottom edge of the peripheral portion 20a of the gasket, in the gap between the perimeters of the prisms 18 and the machined walls 14b of the cover.

The light source 22 is mounted in the presser member 26 by a slideway 26b which leads to an opening 26c where it is locked in place by a pair of resilient tongues 36 passing through the slideway. A color filter 38 held on two opposite edges by protective strips 40 may be installed above the opening 26c of the presser member 26 in a recess therein.

The pod 12 defines a space containing all of the components mounted beneath the cover 14, and in particular the presser member 26 and the light source 22, together with all of the components connecting them to a buried power supply line. The cover 14 is fastened on the pod 12 by screws via an interposed sealing gasket 42.

Although the optical unit described above is in the form of two prisms, it will be immediately apparent that the invention is not limited to that particular configuration, and that it is equally applicable to an optical unit constituted by a single prism or any other optical system whose perimeter is shaped so as to act in the manner of a wedge against the sealing gasket.

Because the gasket is made of a material that is liable to creep, it is not essential for its section in the non-compressed state to coincide exactly with the edges of the cover that have been machined at right angles. For example, the gasket could have planes that are slightly inclined relative to the machined faces, or it could even have ribs.

The design of the sealed mount for the optical unit in the cover of the light of the invention means that it is necessary to machine only the gasket-receiving faces 14a and 14b of the cover. There is no need to machine a surface of the presser member to house the gasket as is required in the device shown in FIG. 1. In addition, machining is facilitated by the fact that face 14b is disposed substantially parallel to the general plane of the cover, and by the fact that face 14a is advantageously perpendicular thereto.

It will also be observed that the way in which the optical unit is mounted makes it possible not only to ensure good sealing, but also to ensure that it is accurately and securely fixed in the cover while still making disassembly possible, particularly for the purpose of gaining access to the inside of the pod during maintenance operations.

I claim:

1. A light fixture for embedding in runways or taxiways comprising:

a pod, a light source secured inside the pod, a cover lying in a plane and closing the pod, said cover being provided with at least one opening, an optical unit co-operating with the light source and mounted in the opening of the cover in a sealed manner via a sealing gasket interposed between the optical unit and the cover, the gasket being of a shape that substantially matches that of a perimeter of a base portion of the optical unit, and pressing means for applying a force along a predetermined direction of tightening travel from said base portion so as to urge said optical unit against said gasket, wherein the cover includes a seat for the gasket, said seat being defined by contact surfaces comprising (i) a wall facing a perimeter of the optical unit and (ii) a top abutment for the gasket parallel to said plane of the cover, and wherein said perimeter of the base portion has a surface of contact with said gasket which is inclined with respect to said predetermined direction of tightening travel, the inclination being inward from said base portion, whereby said surface of contact exerts on said gasket a force having respective components directed perpendicularly toward said wall and said top abutment in response to said tightening travel.

2. A light fixture according to claim 1, wherein said contact surfaces are machined, respectively, perpendicularly and parallel to the plane of the cover.

3. A light fixture according to claim 1, wherein the sealing gasket is made of an elastomer material.

4. A light fixture according to claim 1, wherein the perimeter of said base portion has a shoulder which extends therefrom and acts against an adjacent bottom-edge portion of the sealing gasket in order to urge the gasket against the contact surfaces of the cover.

5. A light fixture according to claim 1, wherein a top of the sealing gasket includes a peripheral sealing lip situated between the perimeter of the optical unit and a wall of the cover that surrounds the opening in the cover.

6. A light fixture according to claim 1, wherein the optical unit comprises two prisms mounted side by side and the sealing gasket is configured like a figure "8" in plan-view, with a central branch thereof being inserted between the two prisms.

7. A light fixture according to claim 6, wherein a top of the central branch of the gasket is extended by lips, each of said lips being situated between an internal reflection face of one of said prism and a facing wall of the cover.

8. A light fixture according to claim 1, wherein said pressing means bears against a bottom surface of the optical unit via a force-transmission plate.

* * * * *